United States Patent [19]
Roberg

[11] Patent Number: 5,928,079
[45] Date of Patent: Jul. 27, 1999

[54] COMBINE HARVESTER

[75] Inventor: Alfons Roberg, Harsewinkel, Germany

[73] Assignee: Claas KGaA, Harsewinkel, Germany

[21] Appl. No.: 08/937,177

[22] Filed: Sep. 25, 1997

[30] Foreign Application Priority Data

Sep. 30, 1996 [DE] Germany .............................. 196 40 055

[51] Int. Cl.$^6$ .................................................. A01F 12/40
[52] U.S. Cl. .............................................. 460/83; 460/112
[58] Field of Search ................................. 460/83, 66, 69, 460/73, 80, 112, 113, 119

[56] References Cited

U.S. PATENT DOCUMENTS 2,020,380  11/1935  Schlayer ..................................... 460/69

FOREIGN PATENT DOCUMENTS 0124628  5/1983  European Pat. Off. .
19600390 A1  12/1996  Germany .

Primary Examiner—Terry Lee Melius
Attorney, Agent, or Firm—Michael J. Striker

[57] ABSTRACT

A combine harvester has a mowing table, a feed conveyor for transporting a mowed product, a threshing mechanism located after the conveyor, and two separating devices located after the threshing mechanism in a product flow direction and each having a separating rotor, each of the separating devices in a region which faces away from the threshing mechanism being provided with a chopper device, the chopper device having chopping knives which are pivotable between an operative position and an inoperative position, spaced from one another by a distance, and fixedly supported on supporting axles which are axis-parallel to rotary axes of the separating rotors of the separating devices, at least one swing lever fixedly mounted on each of the supporting axles and having an end which faces away from the supporting axles, a connecting strap which movably connects the ends of the swing levers with one another, and a drive unit having a driving element with a free end on which the connecting strap is mounted.

9 Claims, 2 Drawing Sheets

COMBINE HARVESTER

BACKGROUND OF THE INVENTION

The present invention generally relates to combine harvesters.

More particularly, it relates to a combine harvester which has a mowing table, an inclined feed conveyor which transports the mowed product, a tangential or axial threshing mechanism located after the inclined feed conveyor, and finally two separating devices which are located after the threshing mechanism in a product flow direction, operate in accordance with the principle of an axial flow, and are each enclosed by a housing.

Each of the separating devices is provided with a chopper device which is arranged in the rear region facing away from the threshing mechanism. Its chopping knives pivotable between an operative position and an inoperative position are fixedly mounted at a distance from one another on supporting axles which are axis-parallel to the rotary axes of the separating rotors of the separating device.

In the combine harvester of the above mentioned type the inclined conveyor is followed by a threshing drum which operates in accordance with the principle of an axial flow or radial flow, and also a transfer drum. The separating rotors of the separating device located after it, depending on the construction of the combine harvester, can extend either parallel and at a distance from the wheel axles or transversely to them. The rotary axes of the separating rotors are parallel to one another and are located at a distance from one another. They extend either horizontally or enclose a small acute angle with the horizontal plane. The rear ends which face away from the threshing drum are higher than the front ends. In other words, the separating rotors rise in a threshed product flow direction. Each separating rotor is surrounded by a two-part housing, with an upper part forming a hood and a lower part forming a separating basket. In a predetermined region in the rear part of each separating rotor, its transporting elements are designed so that they can cooperate with the chopping knives arranged in series, when they are turned to the operative position. For this purpose, the chopping knives are fixedly mounted on the supporting axles which are axis-parallel to the associated separating rotors. When the straw must not be chopped, they are turned outwardly beyond the passage of the transporting elements to an inoperative position.

In the region of the chopper device, the lower part of the housing is formed as a trough. It is provided with a plurality of throughgoing slots for the chopping knives. The chopper device is provided with means for securing against foreign bodies, since it is not completely excluded that non-comminutable foreign bodies can be contained in the straw. The chopping knives are pressed by springs to the operative or working position. They can deviate when a foreign body is located in the straw. Since the chopper device is used selectively and the driver of a combine harvesters always operates under time pressure, it is desired that the operation be very simple and the stoppage times be as little as possible.

SUMMARY OF THE INVENTION

Accordingly, it is an object of the present invention to provide a combine harvester of the above mentioned general type, which avoids the disadvantages of the prior art.

More particularly, it is an object of present invention to provide a combine harvester which has a simple construction and at the same time is formed so that the chopping knives of both separating rotors can be pivoted to an operative position or to an inoperative position by a single adjusting member.

In keeping with these objects and with others which will become apparent hereinafter, one feature of present invention resides, briefly stated, in a combine harvester, in which at least one swing lever is fixedly mounted on each of the axis-parallel supporting axles for the chopping knives, and their ends which face away from the supporting axles are movably connected with one another by a connecting strap which is mounted on a free end of a piston rod of a controllable cylinder-piston unit.

When the combine harvester is designed in accordance with the present invention, it provides for the above mentioned highly advantageous results.

For pivoting the chopping knives of both separating rotors, only one cylinder-piston unit must be now controlled, since both swing levers are movably coupled with one another. A structurally simple solution is provided when the coupling is formed via the connecting strap which is mounted on the piston rod on the cylinder-piston unit. Instead of the cylinder-piston unit, also a similar linear drive can be utilized.

In view of the produced total length of the chopping knives which are arranged in series relative to one another, it is advantageous from stabilization reasons when one swing lever is fixedly mounted on each end of the supporting axles, and its ends are connected with a coupling rod located in the same distance from the supporting axle and mounted in the central region of the connecting strap of the piston rod. In this embodiment a high loadable construction is provided in a simple manner.

The both supporting axles for the chopping knives and the four swing levers mounted on their ends form a frame, such that two members which are arranged parallel to and at a distance from one another are formed by the two swing levers which can change their position. A corresponding design of the connecting region is needed for this purpose. In the simplest manner, the connecting strap is formed as a fork head. Moreover, a structurally simple solution for the movability of the swing levers which are coupled with one another is obtained when they are provided at their ends with elongated holes extending in a longitudinal direction, and a pin inserted in the fork head or the coupling rod is supported in the elongated holes, depending on whether one or two swing levers are mounted on each supporting axle. Since the combine harvester is anyway provided with a hydraulic device, it is advantageous when the cylinder-piston unit is a double-acting hydraulic cylinder-piston unit which is controllable from an operator control panel installed in a driver's cabin of the combine harvester.

In accordance with a further embodiment of the present invention, the both swing levers which are mounted on each supporting axle are connected by a positioning rod extending at a distance from the supporting axle, for limiting the operative position of the chopping knives, and the chopping knives, at the sides facing away from the supporting axle as well as the rotary axes of the separating rotors of the separating device, have abutments which abut against the positioning rod in the operative position. Thereby the chopping knives can not be damaged by contact with the casing of the separating rotor.

Moreover, an exceptionally simple bearing is guaranteed when each chopping knife is provided in the opposite region with an angular recess which is open at the side facing away from the separating rotor. In the normal position, the supporting axle is located in the angled leg. By pressing back a chopping knife against the rotary direction of the separating rotor, it can be withdrawn from the supporting axle through a slot extending perpendicular to the outer edge.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
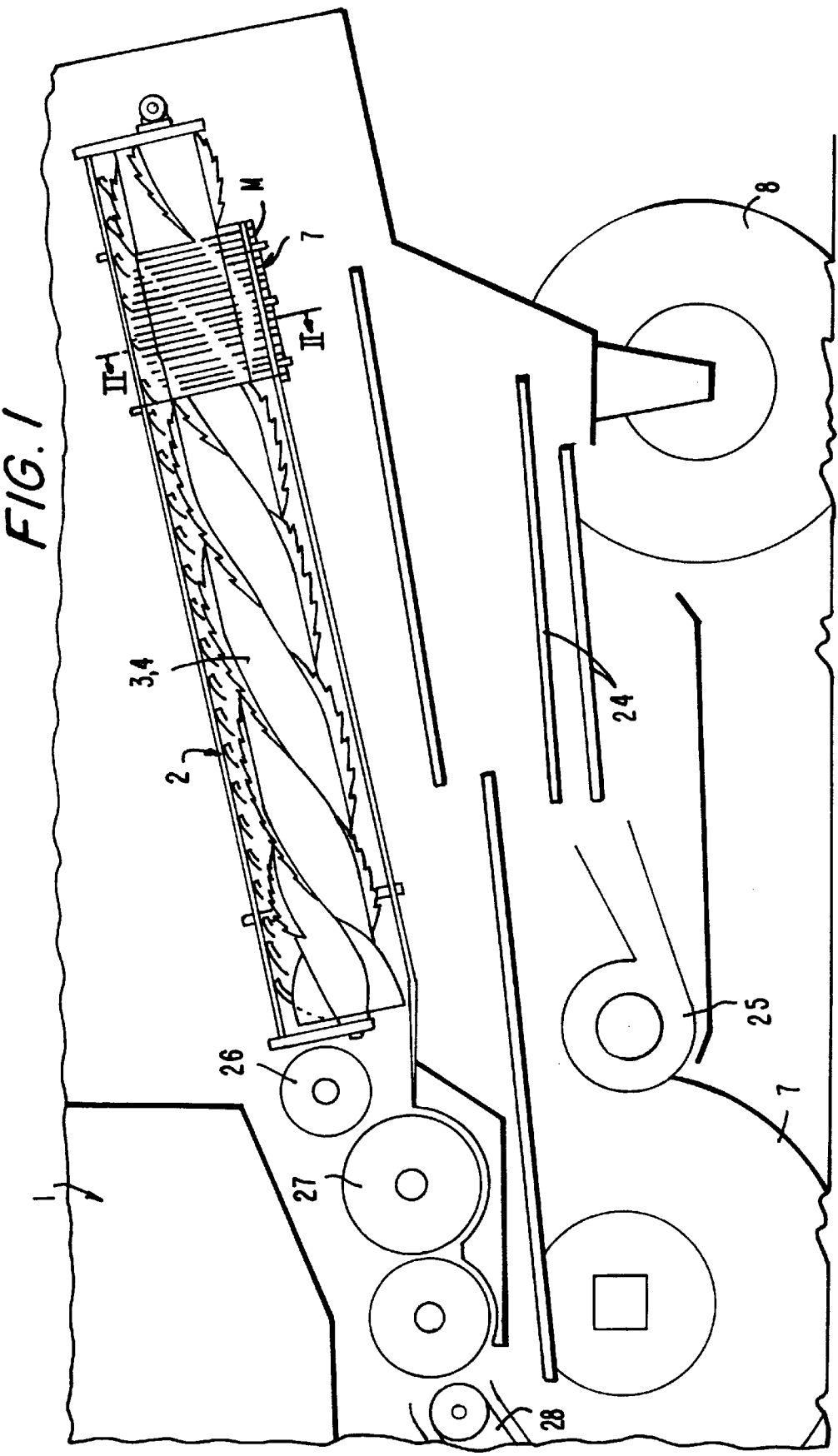
FIG. 1 is a schematic partial side view of a combine harvester in accordance with the present invention.

A combine harvester 1 shown in FIG. 1 has two separating devices 2 each provided with a separating rotor 3 and 4. Each of the separating rotors 3, 4 is surrounded by a housing 5 and 6. The housing is composed of an upper cover hood 5a and 6a and a trough M in the region of an axial flow chopper device 7. The both troughs M are provided with chopping knife throughgoing slots which are spaced at a distance from one another and extend transversely to the rotary axes of the separating rotors 3, 4. The chopping knives 10, 11 of the both separating rotors 3, 4 are arranged in series and supported on throughgoing supporting axles 12, 13 which extend parallel to and a distance from the rotary axes of the separating rotors 3, 4. They are located at the sides of the rotary axes which face away from one another.

Figure 2:
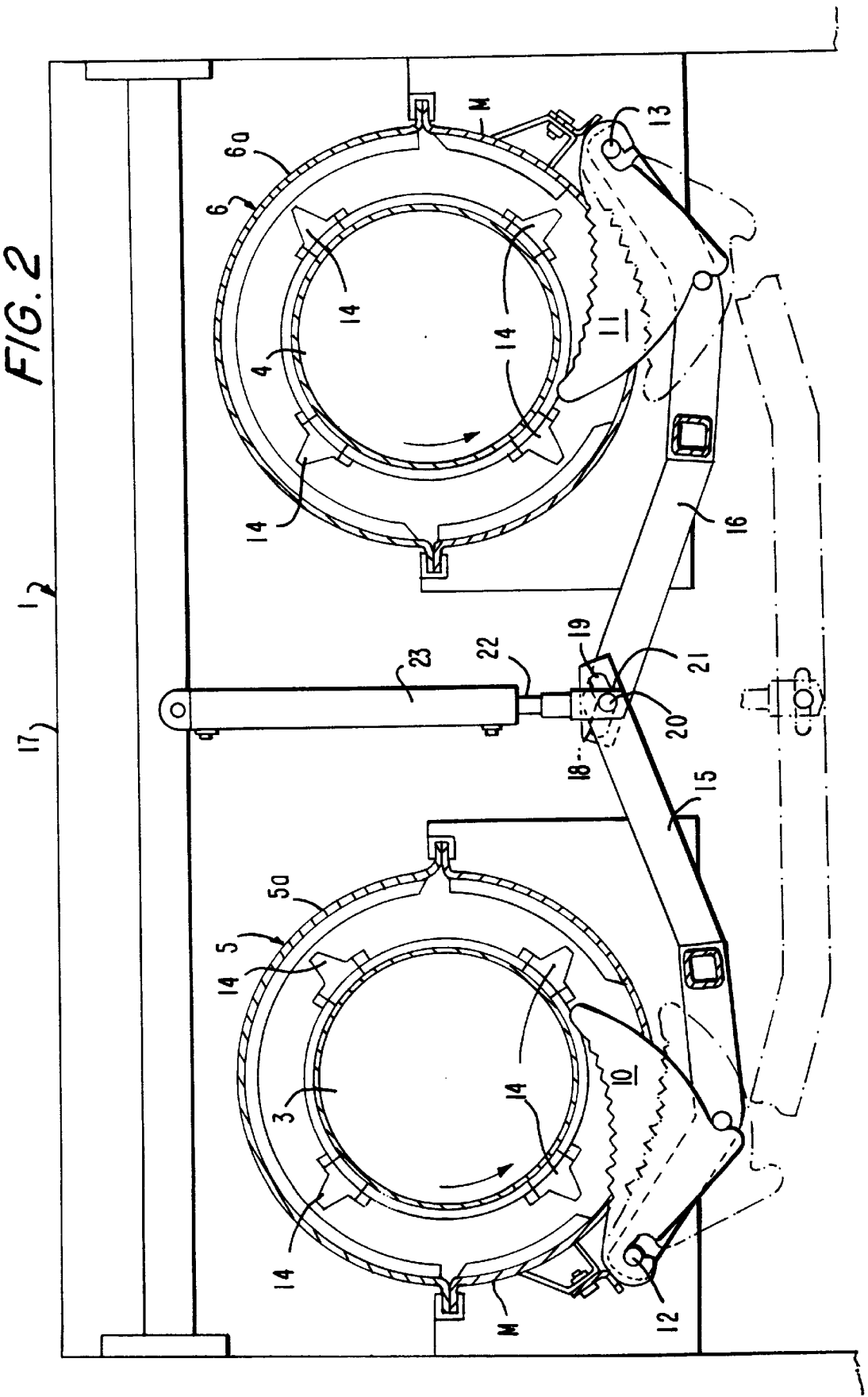
FIG. 2 is a view showing a section taken along the line II—II in FIG. 1 and substantially illustrating both separating devices with separating rotors and chopping knives of the inventive combine harvester.

The operative or working positions of the chopping knives 10, 11 are shown in solid lines. They extend in a rotary path S of impact teeth 14 which are mounted on the separating rotors 3, 4 in a spiral-shaped formation. The right separating rotor 4 shown in FIG. 2 is driven in clockwise direction and the left separating rotor 3 in the same drawing is driven opposite to the clockwise direction. The chopping knife 10, 11 can be pivoted in an opposite direction to an inoperative position shown in dash-dot lines. For this purpose in the shown embodiment of FIG. 2, swing levers 15, 16 are fixedly mounted on the ends of the supporting axles 12, 13. The swing levers 15, 16 are bent two times in direction toward a roof 17 of the combine harvester. The ends which face away from the supporting axles 12, 13 overlap one another and are provided with elongated holes 18, 19 extending in the longitudinal direction.

A connecting strap is arranged on the coupling rod 20 in a central region and formed as a fork head 21. The fork head is supported by the end of a piston rod 22 of the cylinder-piston unit 23. The cylinder-piston unit 23 is formed as a double-working hydraulic cylinder-piston unit which can be controlled from an operator control board of the combine harvester. The operator control board is installed in a driver's cabin of the combine harvester 1. Contrary to the above presented description, a swing lever 15, 16 is mounted in the central region of each supporting axle 12, 13. The coupling is then performed by a pin and the fork head 21.

For pivoting the chopping knives 10, 11 to the working position shown in dot-dash lines, the driver of the combine harvesters 1 must activate the cylinder-piston unit 23. The swing levers 15, 16 are then turned to a lower end position shown in dash-dot lines. The turning to the operative position is performed also by controlling from the operator control panel.

As can be seen from FIG. 1, both separating rollers 3, 4 are inclined relative to the horizontal plane and rise rearwardly, or in other words to a discharge end for the chopped product or the straw. The combine harvester 1 is also provided with both wheel pairs 7 and 8. The grain separated by the separating device 2 falls on a sieve device 24 which is not shown in detail. The cleaning of the grain is supported by a blower 25. When seen in the throughgoing direction of the threshed product, a transfer drum 25 and a threshing drum 27 are located before the separating device 2. An inclined transporting passage 28 is further provided and its outlet end is shown in the drawings. In the illustrated embodiment of FIG. 1, both rotary axes of the separating rotors 3, 4 extend transversely to the axles of the wheel pairs 7, 8. However, in another construction, they can be located parallel to and at a distance from these axles.

The swing levers 15, 16 of both ends are connected by positioning rods 29, 30. The positioning rods are associated with the chopping knives 10, 11 and extend parallel to and at a distance from the supporting axles 12, 13. The chopping knives 10, 11 are provided with projections at the sides facing away from the rotary axles of the separating rotors 13, 14 and the supporting axles 12, 13. The projections form abutments 32, 33 which abut against the positioning rods 29, 30. The supporting axles 12, 13 are located in angular recesses 34, 35 of the chopping knives 10, 11. These recesses 34, 35 are open at the sides facing away from the separating rotors 3, 4. In the normal position, the supporting axles 12, 13 are located in the angled regions. For exchanging a chopping knife 10, 11 it must pivot against the rotary direction of the separating rotor 3 or 4, so that it can be withdrawn through the recess 34 or 35 from the supporting axle 12 or 13. The normal position is secured by the positioning rod 29, 30, since the sides of the chopping knives which face away from the supporting axles 12, 13 extend over a corresponding arc.

It will be understood that each of the elements described above, or two or more together, may also find a useful application in other types of constructions differing from the types described above.

While the invention has been illustrated and described as embodied in combine harvesters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

I claim:

1. A combine harvester, comprising a mowing table; a feed conveyor for transporting a mowed product; a threshing mechanism located after said feed conveyor; and two separating devices located after said threshing mechanism in a product flow direction and each having a separating rotor, each of said separating devices being provided with a chopper device, said chopper device having chopping knives which are pivotable between an operative position and an inoperative position, spaced from one another by a distance, and fixedly supported on supporting axles which are axis-parallel to rotary axes of said separating rotors of said separating devices; at least one swing lever fixedly mounted on each of said supporting axles and having an end spaced from said supporting axles; a connecting strap which connects said ends of said swing levers with one another; and a drive unit having a driving element with a free end on which said connecting strap is mounted for moving said connecting strap and thereby said swing levers.

2. A combine harvester as defined in claim 1, wherein said separating devices operate in accordance with a principle of an axial flow, said chopper device also operating in accordance with a principle of an axial flow.

3. A combine harvester as defined in claim 1, wherein said drive unit is a controllable cylinder-piston unit, said driving element being a piston rod having said free end on which said connecting strap is mounted.

4. A combine harvester as defined in claim 3, wherein one of said swing levers is fixedly mounted on both ends of said supporting axles; and further comprising a coupling rod which connects ends of said swing levers at a same distance from said supporting axles, said piston rod being mounted on said coupling rod in a central region of said connecting strap.

5. A combine harvester as defined in claim 1, wherein said connecting strap which connects said ends of said swing levers is formed as a fork head.

6. A combine harvester as defined in claim 5, wherein said ends of said swing levers are provided with elongated holes extending in a longitudinal direction; and further comprising a connecting element inserted in said fork head and supported in said elongated holes.

7. A combine harvester as defined in claim 6, wherein said connecting element is formed as a pin.

8. A combine harvester as defined in claim 6, wherein said connecting element is formed as coupling rod.

9. A combine harvester as defined in claim 3, wherein said cylinder-piston unit is a double-acting hydraulic cylinder-piston unit which is controllable from an operator control board in a cabin of the combine harvester.

\* \* \* \* \*